Aug. 29, 1939. J. BEAVAN 2,171,352
EMERGENCY BRAKE APPARATUS FOR MOTOR ROAD VEHICLES
Filed Aug. 31, 1938 2 Sheets-Sheet 1

Aug. 29, 1939.　　　J. BEAVAN　　　2,171,352
EMERGENCY BRAKE APPARATUS FOR MOTOR ROAD VEHICLES
Filed Aug. 31, 1938　　　2 Sheets-Sheet 2

Inventor
John Beavan

Patented Aug. 29, 1939

2,171,352

UNITED STATES PATENT OFFICE 2,171,352

EMERGENCY BRAKE APPARATUS FOR MOTOR ROAD VEHICLES

John Beavan, Ayr, Scotland

Application August 31, 1938, Serial No. 227,640
In Great Britain November 17, 1937

2 Claims. (Cl. 188—5)

This invention relates to emergency brake apparatus for motor road vehicles of the type including brake members mounted on the chassis of the vehicle and engageable directly with the road under the control of the driver.

The present invention, which may be regarded as a further development of the invention forming the subject of my U. S. Patent No. 2,086,113 issued on July 6, 1937, relates to the combination of improved rear road-engaging brake shoes with front road-engaging skate-blades mounted on the stub axles of the vehicle.

According to the invention, for the purpose of restraining the vehicle against lateral swinging movement, the rear brake shoes are fitted with road-engaging skate-like blades, and there is mounted on each stub axle at the front of the vehicle, so as to participate in the steering movements thereof, a pressure fluid cylinder accommodating a piston carrying a road-engaging skate blade which is depressed into engagement with the road when the cylinder is supplied with pressure fluid.

Desirably, each front blade is pivotally connected to its piston so that it may follow the contour of the surface upon which the vehicle is riding.

Figure 1:
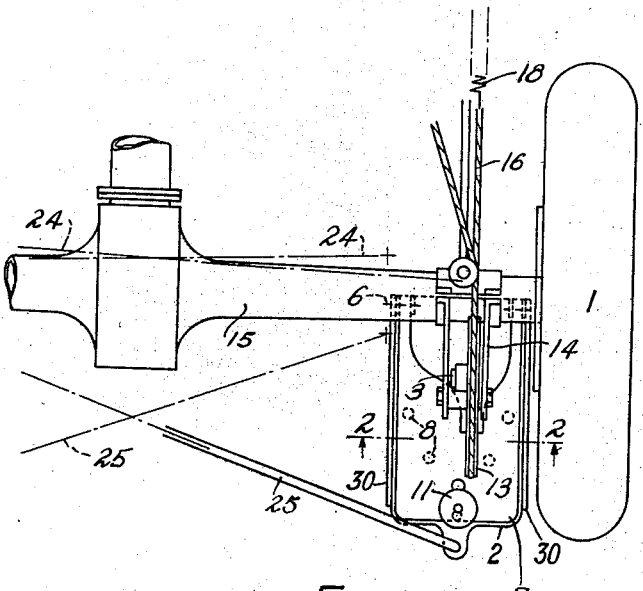
Figure 2:
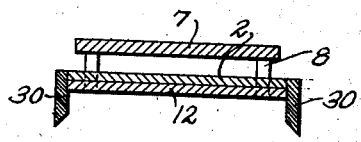
Figure 3:
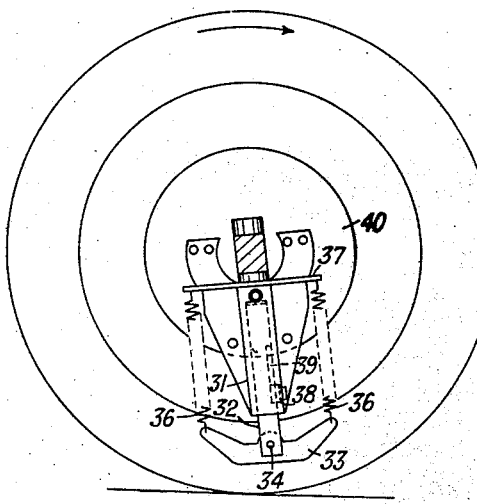
Figure 4:
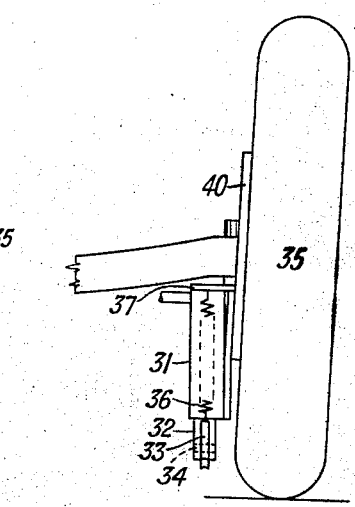
Figure 5:
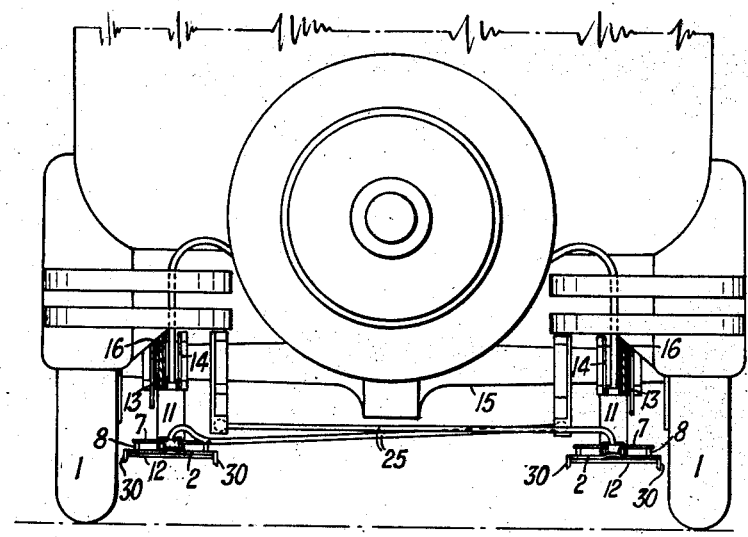
Figure 6:
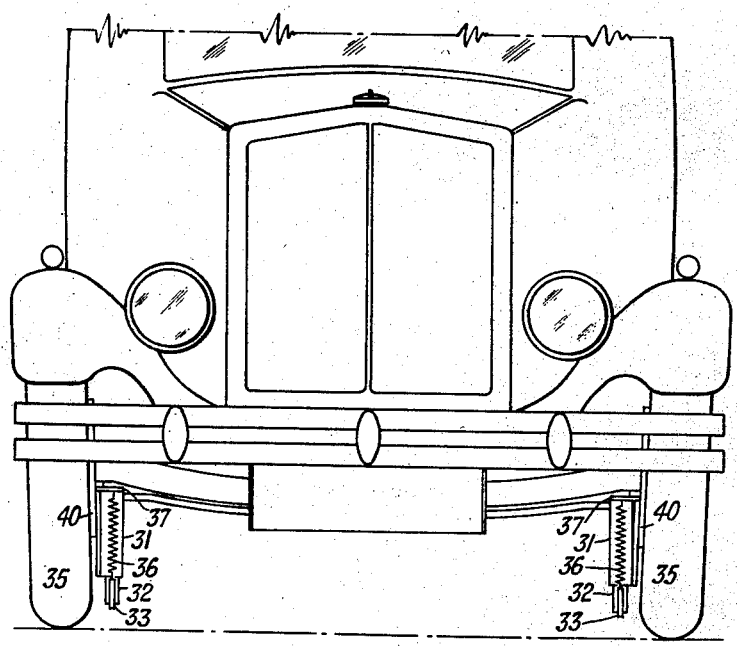

The invention is illustrated in the accompanying drawings in which Fig. 1 is a fragmentary plan, and Fig. 2 a fragmentary transverse vertical section drawn to a larger scale, on the line 2—2 of Fig. 1, showing one of a similar pair of emergency rear brakes of a motor road vehicle, and Fig. 3 is a part side elevation part vertical section and Fig. 4 an end elevation, showing one of the similar pair of emergency front brakes of the vehicle. Figs. 5 and 6 are assembly views showing the apparatus mounted on the rear and on the front, respectively, of a motor road vehicle.

Referring to Figs. 1, 2, and 5 of the drawings, there is mounted adjacent to each rear road wheel 1 of the vehicle a brake shoe 2 which is vertically movable so as to be engageable with the road under the control of the driver of the vehicle.

As in the construction described in the specification of my U. S. Patent No. 2,086,113, each brake shoe 2 is operatively connected to a power-driven crankpin 3 and has hinged at 6 to its forward end a top plate 7 presenting a plurality of downwardly-projecting spikes 8 which are disposed in register with holes in the associated shoe 2. The spikes 8 are engageable with the road, while the shoe 2 is in engagement with the road, by pneumatic actuation of a piston contained in cylinder 11, whereby to depress the plate 7 in opposition to the action of a spring. The cylinder 11 is supported by the shoe 2 and is connectible to a source of compressed air or other gas, under the control of the driver. The shoe 2 is armed on its underside with a lining 12 of bonded asbestos or other friction material.

The crankpin 3 is carried by a pulley 13 journalled in a forked bracket 14 attached to the rear axle casing 15. Each pulley 13 is wrapped by a rope 16 attached thereto, and leading from a tension spring anchorage 18, around the pulley 13, to a common piston actuator. Stay rods 24, 25 connect the shoes 2 with brackets on the axle casing 15, but permit free vertical movement of the shoes.

Attached to each brake shoe 2 are two skate-like blades 30 extending lengthwise of the vehicle, being fitted one to each longitudinal edge of the respective shoe 2. The blades 30 project slightly below the road-engaging surface 12 of the shoe and their road-engaging edges are bevelled as shown in Fig. 2. As will be understood, in use, when the brake shoes 2 are depressed into engagement with the road, the skate blades 30 bite into the road and thus restrain the vehicle against lateral displacement.

For the purpose of restraining the forward part of the vehicle against lateral displacement, there is mounted on the flange 40 of each stub axle (Figs. 3 and 4), so as to participate in the steering movements of the respective stub axle, a cylinder 31 which is connectible, under the control of the driver, to a source of pressure fluid supply. The cylinder 31 accommodates a piston 32 of which the lower end projects through the open lower end of the cylinder and carries a skate-like blade 33 which is pivotally connected at 34 to the lower end of the piston 32 and is disposed in parallelism with the line of travel of the respective front wheel 35. The piston 32 is maintained normally in retracted position, with the skate blade 33 clear of the road, by a pair of tension springs 36 connected to the ends of the blade 33 and to a bracket 37 unitary with the cylinder 31. As will be understood, in use, when pressure fluid is supplied to the cylinder 31 the piston 32 is protruded in opposition to the action of the springs 36 whereby the blade 33 is depressed into engagement with the road, the pivot 34 permitting the blade to follow the contour of the road upon which the vehicle is riding. For preventing rotation of the piston 32 relatively to the cylinder 31 and also to prevent excessive travel of the piston, there is incorporated in the bore of the cylinder 31 a feather 38 engaging a featherway 39 in the piston and serving as a stop to limit the travel of the piston. As will be understood, when the piston is in protruded position, and when the cylinder is opened to exhaust, the stress of the springs 36 restores the piston to normal or retracted position within the cylinder.

I claim—

1. Emergency brake apparatus for motor road vehicles, comprising, in combination, road-engaging brake shoes located at the rear of the vehicle, skate-like blades fitted to said brake shoes and projecting below the road-engaging surfaces of the brake shoe so as, when the brake shoes are engaged with the road, to bite into the road and thus to restrain the vehicle against lateral swinging movement, a pressure fluid cylinder fitted to each stub axle at the front of the vehicle, a piston working within each cylinder, and a skate blade carried by each piston and adapted to be engaged with the road whereby to restrain the front of the vehicle against lateral displacement.

2. Emergency brake apparatus as claimed in claim 1 in which each front skate blade is pivotally connected to its piston and in which the blade is adapted to be restored to inoperative position by a spring or springs acting thereon.

JOHN BEAVAN.